United States Patent [19]

Goodwin

[11] Patent Number: 4,777,343

[45] Date of Patent: Oct. 11, 1988

[54] PLASMA ARC APPARATUS

[75] Inventor: David E. Goodwin, Kegworth, Great Britain

[73] Assignee: D. E. Goodwin Engineering Developments Limited, Loughborough, England

[21] Appl. No.: 845,612

[22] Filed: Mar. 28, 1986

[30] Foreign Application Priority Data

Apr. 3, 1985 [GB] United Kingdom ................ 8508758

[51] Int. Cl.[4] ................................................ B23K 9/00

[52] U.S. Cl. .................................. 219/121.5; 219/75; 219/121.51; 219/121.48; 219/121.49; 313/231.41

[58] Field of Search .................. 219/121 PP, 121 PQ, 219/121 P, 121 PM, 121 PN, 74, 75; 313/231.41, 231.51

[56] References Cited

U.S. PATENT DOCUMENTS

| | | | |
|---|---|---|---|
| 3,674,978 | 7/1972 | Becker et al. | 219/121 PR |
| 4,059,743 | 11/1977 | Esibian et al. | 219/121 PR |
| 4,311,897 | 1/1982 | Yerushalmy | 219/121 PQ |
| 4,521,666 | 6/1985 | Severance et al. | 219/121 PP |
| 4,581,516 | 4/1986 | Hatch et al. | 219/121 PQ |

*Primary Examiner*—M. H. Paschall

*Attorney, Agent, or Firm*—Trexler, Bushnell, Giangiorgi & Blackstone, Ltd.

[57] ABSTRACT

The invention relates to plasma arc apparatus. In plasma arc apparatus it is known to provide a torch, there being provided within the torch an electrode suitably connected to a source of supply, and there being the provision for the passage of gas through the torch and through a nozzle on the torch and for the supply of coolant to reduce the temperature of the electrode and the nozzle during use. A construction of plasma arc apparatus with a torch in which the electrode can be removed and replaced with relative ease and which at the same time provides for effective sealing between the electrode and its support member is already known, and the object of the invention is to improve such known construction, which objective is met by a construction having a retaining bush engaging with the electrode and being engaged by a secondary nozzle and whereby the electrode is maintained in place substantially co-axial with the outlet orifice of said primary nozzle, said secondary nozzle being engaged by said primary nozzle, such as to space the retaining bush from the primary nozzle, and there being means to allow the passage of gas from within the electrode to the space between the retaining bush and the primary nozzle, and into the primary nozzle.

7 Claims, 1 Drawing Sheet

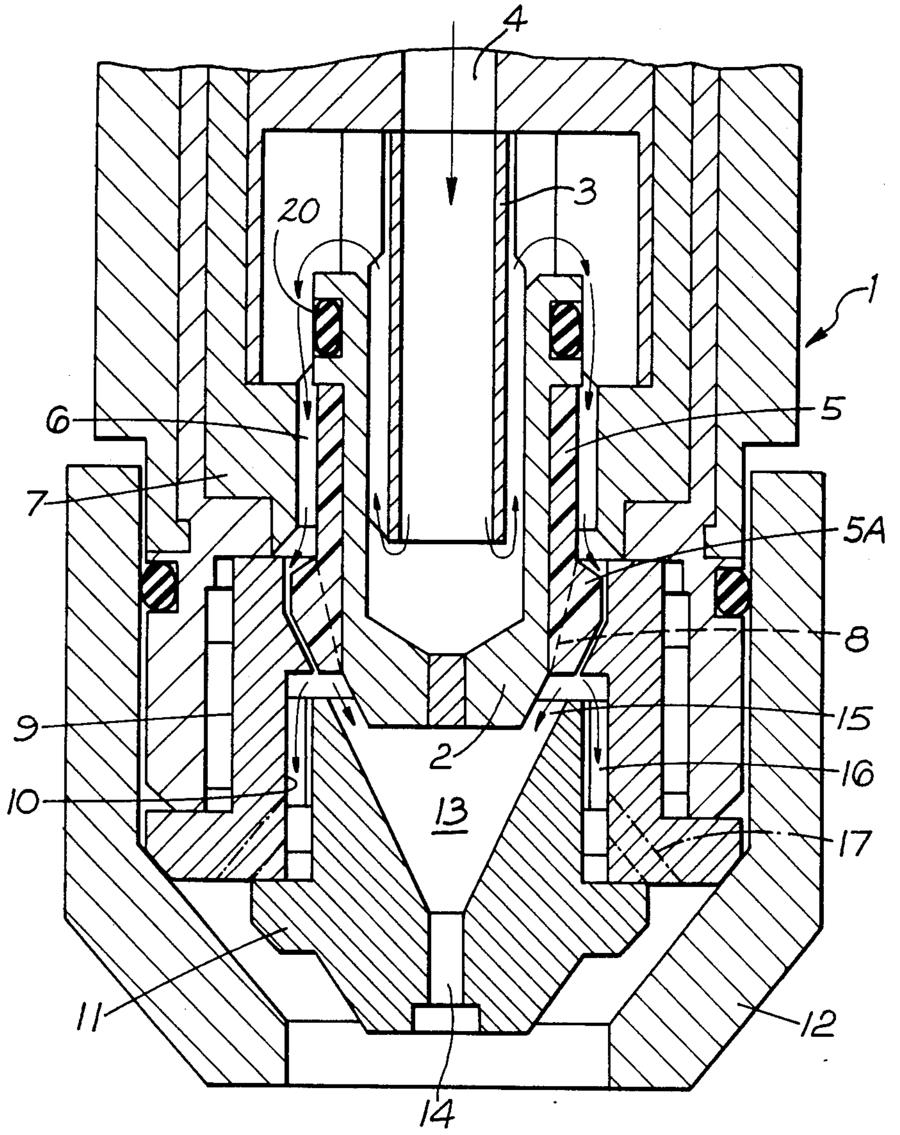
4
3
20
1
6
5
7
5A
8
9
15
2
16
10
13
17
11
12
14

PLASMA ARC APPARATUS

BACKGROUND OF THE INVENTION

This invention relates to plasma arc apparatus and is particularly concerned with a construction for use with a plasma arc torch.

In plasma arc apparatus it is known to provide a torch, there being provided within the torch an electrode suitably connected to a source of supply, and there being the provision of the passage of gas through the torch and through a nozzle on the torch and for the supply of coolant to reduce the temperature of the electrode and the nozzle during use.

Thus, when the torch is started, and electrical power supplied to the electrode, an arc is struck between the electrode and the nozzle this causing ionization of the gas passing through the nozzle, producing a short jet of conductive plasma. That short jet of conductive plasma can be brought into close proximity with a workpiece to effect the work required, or, with the workpiece itself connected in the circuit, the workpiece then serves as an electrode for an arc that can be struck between the electrode and the workpiece itself.

By providing coolant to the torch there is the belief that there is the prevention of ionization of gas near the sides of the nozzle thereby leaving a constricted conductive path in the centre of the gas flow. This has the advantageous effect of concentrating the energy in the main arc into a narrow region, and by changing the electrical properties of the arc (e.g., by increasing the number of volts per length) enables more energy to be put into this region for a given arc current. The effect of this is to produce arc temperatures very mnuch higher than those in so-called free arcs and very high energy densities in the arc itself.

When such apparatus is used in welding, cutting or similar processes, energy can be applied very precisely to the workpiece where it is required to melt the workpiece, with very low heat dissipation into the surrounding material.

Hitherto there have been various constructions of torch intended to provide for the reasonably ready replacement of the electrode itself which is of course consumed. Thus, there is one known construction where the electrode is screwed on to an electrode tube lying centrally of the torch but here sealing of the electrode to the tube relies on the metal to metal contact between the electrode and the tube and can be somewhat unreliable. In addition to this even with the provision of coolant the electrode tube and electrode are inevitably heated and this can cause the electrode to become very tightly secured to the tube and hence increase the difficulty of removing a burnt out electrode. In an attempt to overcome this problem it is known in a screwed construction to provide additional sealing O-rings, and whilst this can solve the problem of effecting sealing still leaves the problem of electrode removal.

A construction of plasma arc apparatus with a torch in which the electrode can be removed and replaced with relative ease and which at the same time provides for effective sealing between the electrode and its support member is described and claimed in British Pat. No. 2095520B, and it is the object of the present invention to provide still further improvements to the plasma arc apparatus therein disclosed.

SUMMARY OF THE INVENTION

According to the present invention, plasma arc apparatus comprises a torch, an electrode within the torch and a primary nozzle associated with the electrode, the torch having an electrode holder with means at the end facing the primary nozzle for engaging with the electrode, said electrode being a push-fit into engagement with said means on the electrode holder, there being a gas passageway through the electrode holder said gas passageway extending through the electrode engagement means whereby gas is directed at the rear end of the electrode, and there being a retaining bush engaging with the electrode and being engaged by an intermediate nozzle holder, hereinafter referred to as a secondary nozzle and whereby the electrode is maintained in place substantially co-axial with the outlet orifice of said primary nozzle, said secondary nozzle being engaged by said primary nozzle, such as to space the retaining bush from the primary nozzle, and there being means to allow the passage of gas from within the electrode to the space between the retaining bush and the primary nozzle, and into the primary nozzle.

In use, the primary nozzle of the apparatus becomes extremely hot, and as the retaining bush is conveniently formed from a relatively low melting point material, such as a suitable plastics material, direct contact between it and the primary nozzle can result in damage and distortion. With the invention, the retaining bush is spaced from the primary nozzle, and more than that, gas passing from the rear of the electrode and through the passageways referred to above, creates a heat insulating layer between the primary nozzle and the retaining bush. Consequently, transfer of heat from the primary nozzle to the retaining bush by both conduction and convection is substantially eliminated, with the consequent substantial elimination of damage and distortion of the retaining bush.

A further advantage of the invention is that gas can be directed externally of the primary nozzle for considerably improved cooling of the primary nozzle itself during use, by providing a passageway between the primary and secondary nozzles.

The gas may be air, and it is further preferred that the secondary nozzle is of a material of relatively low thermal conductivity such as stainless steel.

Sealing means such as an O-ring 20 may be provided to ensure adequate engagement between the electrode and the electrode holder, whether the means at the end of the electrode is a hole into which the electrode is a push-fit, or a spigot on to which the electrode is a push-fit. Both as a means of providing an effective supply of gas and as a means of providing greater electrical contact between the electrode and the electrode holder, it is preferred that the spigot is a tube of conductive material in engagement with the electrode holder and in communication with the gas passage therethrough. With this construction, the electrode itself has a bore extending from its rear face in which the tube is a push-fit, to bring the tube into close proximity with its operative end.

A still further advantage of the invention is the avoidance of the need for the separate supply of gas for the plasma arc, and coolant. The gas serving initially as the coolant for the electrode and emerging into the space between the retaining bush and the primary nozzle, may be branched at that point, with part of the gas supply passing into the primary nozzle to serve as the gas for the plasma arc, and the remainder flowing into or through the passageways between the primary and secondary nozzles.

BRIEF DESCRIPTION OF THE DRAWING

One embodiment of the invention will now be described with reference to the accompanying drawing and which is a sectional side elevation through plasma arc apparatus in accordance with the invention.

DETAILED DESCRIPTION OF THE ILLUSTRATED EMBODIMENT

In the drawing, plasma arc apparatus has a torch 1, with an electrode 2 that is a push fit onto an externally ribbed electrical contact tube 3, the tube being secured in the apparatus co-axial with a supply passage 4 for gas. Externally of the electrode is a plastics insulating retaining bush 5 that is a push fit on the electrode, and which forms an annular gap 6 with a body member 7. At its lower end, the bush 5 has a head 5A with through slots or holes 8 to form gas passageways, that communicate with the annular gap between the bush and the body member.

Surrounding the lower end of the bush 5 is a an intermediate nozzle holder, hereinafter referred to secondary nozzle 9 that is a screw fit in the torch body, and in the bore 10 of the secondary nozzle a primary nozzle 11 is a screwed fit, the arrangement being such that the primary nozzle is distanced from the plastics bush 5, and an end cap 12 is provided to protect te outside of the torch. Within the primary nozzle is a chamber 13 having a central outlet 14, the upper end of the chamber being distanced from the end of the electrode to provide an annular gap 15 communicating with the gas passageways 8 in the insulating bush 4. Although not essential, it is possible, as indicated to provide a gap 16 between the secondary nozzle and primary nozzle, and to provide outlet passageways 17 on the secondary nozzle.

Thus, in use, gas is supplied through the supply passage 4 and down the contact tube from where it impinges on the rear face of the electrode 2. The gas then flows up through the gaps between the ribs on the tube and down through the annular gap between the bush 5 and the body member 7. From there, the gas flows through the annular gap between the electrode 2 and the primary nozzle 11, and into the chamber 13 where it is ionised by an arc initially struck between the electrode and the primary nozzle, and subsequently between the electrode and the workpiece.

Thus by distancing the primary nozzle from the plastics bush, and by providing a gas flow between the bush and the primary nozzle, there is the substantial elimination of any heat transfer from the primary nozzle to the bush, either by conduction or convection, and consequently the substantial elimination of any damage to the plastics bush.

When provided, the gap 16 is filled with gas to provide insulation between the primary and secondary nozzle to prevent undue heating of the secondary nozzle, and again when provided, the passageways 17 allow a flow of gas externally of the primary nozzle to provide a cooling effect on the primary nozzle, which can be advantageous.

What I claim is:

1. Plasma arc apparatus comprising a torch, an electrode within the torch and a primary nozzle associated with the electrode, the torch having an electrode holder with means at the end facing the primary nozzle for engaging with the electrode, said electrode being a push-fit into engagement with said means on the electrode holder, there being a gas passageway through the electrode holder, said gas passageway extending through the electrode engagement means whereby gas is directed at the rear end of the electrode, there being a retaining bush engaging with the electrode and being engaged by an intermediate nozzle holder and whereby the electrode is maintained in place substantially co-axial with the outlet orifice of said primary nozzle, said intermediate nozzle holder being engaged by said primary nozzle, such as to space the retaining bush from the primary nozzle, and there being means to allow the passage of gas from within the electrode to the space between the retaining bush and the primary nozzle, and into the primary nozzle; wherein passageways are provided in the intermediate nozzle holder for the further direction of gas around the exterior of the primary nozzle.

2. Plasma arc apparatus as in claim 1, wherein gas is directed externally of the primary nozzle by providing an annular gap between the primary nozzle and the intermediate nozzle holder.

3. Plasma arc apparatus as in claim 1, wherein sealing means is provided to ensure adequate engagement between the electrode and the electrode holder.

4. Plasma arc apparatus as in claim 1, wherein the gas serving initially as the coolant for the electrode and emerging into the space between the retaining bush and the primary nozzle, may be branched at that point, with part of the gas supply passing into the primary nozzle to serve as the gas for the plasma arc, and the remainder flowing into or through the passageways between the primary and nozzle and intermediate nozzle holder.

5. Plasma arc apparatus comprising a torch, an electrode within the torch and a primary nozzle associated with the electrode, the torch having an electrode holder with means at the end facing the primary nozzle for engaging with the electrode, said electrode being a push-fit into engagement with said means on the electrode holder, there being a gas passageway through the electrode holder, said gas passageway extending through the electrode engagement means whereby gas is directed at the rear end of the electrode, there being a retaining bush engaging with the electrode and being engaged by an intermediate nozzle holder and whereby the electrode is maintained in place substantially co-axial with the outlet orifice of said primary nozzle, said intermediate nozzle holder being engaged by said primary nozzle, such as to space the retaining bush from the primary nozzle, and there being means to allow the passage of gas from within the electrode to the space between the retaining bush and the primary nozzle, and into the primary nozzle; wherein sealing means is provided to ensure adequate engagement between the electrode and the electrode holder, whether the means at the end of the electrode holder is a hole into which the electrode is a push-fit, or a spigot on to which the electrode is a push-fit.

6. Plasma arc apparatus as in claim 5, wherein as a means of providing an effective supply of gas and as a means of providing greater electrical contact between the electrode and the electrode holder the spigot is a tube of conductive material in engagement with the electrode holder and in communication with the gas passage therethrough.

7. Plasma arc apparatus as in claim 5, wherein as a means of providing an effective supply of gas and as a means of providing greater electrical contact between the electrode and the electrode holder the spigot is a tube of conductive material in engagement with the electrode holder and in communication with the gas passage therethrough.

* * * * *